US012735629B2

(12) United States Patent
Napoli et al.

(10) Patent No.: US 12,735,629 B2
(45) Date of Patent: Sep. 15, 2026

(54) PHOSPHORESCENT ELASTOMER MASTER MIXTURE AND HOROLOGICAL COMPONENT COMPRISING SUCH A MIXTURE

(71) Applicant: The Swatch Group Research and Development Ltd, Marin (CH)

(72) Inventors: Sophie Napoli, Neuchâtel (CH); Nicolas Francois, Neuchâtel (CH)

(73) Assignee: The Swatch Group Research and Development Ltd, Marin (CH)

( * ) Notice: Subject to any disclaimer, the term of this patent is extended or adjusted under 35 U.S.C. 154(b) by 818 days.

(21) Appl. No.: 18/015,460

(22) PCT Filed: Jun. 17, 2021

(86) PCT No.: PCT/EP2021/066490
§ 371 (c)(1),
(2) Date: Jan. 10, 2023

(87) PCT Pub. No.: WO2022/017696
PCT Pub. Date: Jan. 27, 2022

(65) Prior Publication Data

US 2023/0279288 A1 Sep. 7, 2023

(30) Foreign Application Priority Data

Jul. 22, 2020 (EP) .................................... 20187226

(51) Int. Cl.

| | |
|---|---|
| ***C09K 11/02*** | (2006.01) |
| ***A44C 5/00*** | (2006.01) |
| ***C08J 3/22*** | (2006.01) |
| ***C08L 27/24*** | (2006.01) |
| ***C09K 11/08*** | (2006.01) |

(52) U.S. Cl.
CPC ................ *C09K 11/02* (2013.01); *A44C 5/00* (2013.01); *C08J 3/226* (2013.01); *C08L 27/24* (2013.01); *C09K 11/08* (2013.01); *C08J 2300/26* (2013.01); *C08J 2327/12* (2013.01); *C08J 2327/24* (2013.01); *C08L 2310/00* (2013.01); *C08L 2312/00* (2013.01)

(58) Field of Classification Search
CPC ........... C09K 11/02; C09K 11/06; A44C 5/00; C08L 27/24; C08L 2310/00; C08L 2312/00; C08J 3/226; C08J 2327/12; C08J 2327/24; C08J 2300/26
See application file for complete search history.

(56) References Cited

U.S. PATENT DOCUMENTS

| | | | | |
|---|---|---|---|---|
| 6,431,236 | B1 * | 8/2002 | Kanenari | .............. B60C 1/0025 152/450 |
| 2018/0095427 | A1 * | 4/2018 | Francois | ................ G04B 37/08 |

FOREIGN PATENT DOCUMENTS

| | | | |
|---|---|---|---|
| CN | 106674710 | A | 5/2017 |
| EP | 0 692 735 | A1 | 1/1996 |
| EP | 1 517 976 | B1 | 11/2006 |
| EP | 3 306 419 | A1 | 4/2018 |
| EP | 3 501 324 | A1 | 6/2019 |
| JP | 10-121424 | A | 5/1998 |
| JP | 2000-44733 | A | 2/2000 |
| JP | 4030196 | B2 | 1/2008 |

OTHER PUBLICATIONS

International Search Report for PCT/EP2021/066490 dated Oct. 1, 2021 [PCT/ISA/210].

* cited by examiner

*Primary Examiner* — C Melissa Koslow
(74) *Attorney, Agent, or Firm* — Sughrue Mion, PLLC

(57) ABSTRACT

The present invention relates to a master mixture comprising:

from 40 to 95% by weight of a photoluminescent pigment, said pigment having a particle size limited by sifting at 30 μm;

5 to 60% by weight of a polymer in the form of an elastomer or an elastomer precursor chosen from fluorinated polymers from the FKM family, the polyurethane (TPU) family, Ethylene vinyl acetate (EVA) copolymers, silicones, ethylene propylene rubbers (EPR) and the thermoplastic derivatives (TPO) thereof and acrylic elastomers.

7 Claims, No Drawings

PHOSPHORESCENT ELASTOMER MASTER MIXTURE AND HOROLOGICAL COMPONENT COMPRISING SUCH A MIXTURE

CROSS REFERENCE TO RELATED APPLICATIONS

This application is a National Stage of International Application No. PCT/EP2021/066490 filed Jun. 17, 2021, claiming priority based on European Patent Application No. 20187226.4 filed Jul. 22, 2020.

TECHNICAL FIELD

The invention relates to a master mixture for a phosphorescent elastomeric composition and a horological or jewelry component comprising a component in such a master mixture.

TECHNOLOGICAL BACKGROUND

Photoluminescent elastomer materials are fairly common on the market, for varied applications, such as tyres, signage accessories, etc. (For example: U.S. Pat. No. 6,431,236B1, JPH10121424A).

The known embodiment of these photoluminescent elastomer materials is defined by the direct mixture of an elastomer and the photoluminescent pigment at a mass content of 30% maximum (For example: JP4030196B2, JP2000044733A).

Watchmaking companies already offer silicone-based phosphorescent bracelets, but Bell&Ross recently developed the supply by offering, in a limited edition, a watch equipped with a phosphorescent rubber bracelet. For its luminescent synthetic rubber bracelet, Bell&Ross adds pigments directly into the material, which is then hot-moulded and pressed. In order to limit the wear of the mixing tool, the filler content was limited to 20%: the performances suffer and are not satisfactory for this type of applications.

These embodiments and the mixtures resulting therefrom have the following disadvantages:

premature wear of the mixing tool, contamination of the mixture by metallic particles from the wear of the mixing tool, limited luminous performances.

SUMMARY OF THE INVENTION

The aim of the invention is that of providing a phosphorescent composition which does not suffer from the drawbacks described above.

[1] The present invention relates to a master mixture comprising:

from 40 to 95% by weight of a photoluminescent pigment, said pigment having a particle size limited by sifting at 30 μm;

5 to 60% by weight of a polymer in the form of an elastomer or an elastomer precursor chosen from fluorinated polymers from the FKM (abbreviation for "fluoroelastomer materials") family, the polyurethane (TPU) family, Ethylene vinyl acetate (EVA) copolymers, silicones, ethylene propylene rubbers (EPR) and the thermoplastic derivatives (TPO) thereof and acrylic elastomers, preferably.

[2] Advantageously, the master mixture of the invention comprises 0.2 to 2% by weight with respect to the polymer of natural wax (e.g. carnauba wax) or mineral wax (paraffins, petrolatum) and/or oil (mixtures of fatty alcohol, fatty acids or fatty acid esters such as triglycerides).

[3] Preferably, the master mixture comprises 0.1 to 2% of chromophores and/or fluorochromes.

[4] Preferably, in the master mixture, the polymer is an FKM.

[5] Advantageously, the master mixture comprises no crosslinking agent, the latter, when required, being added separately into the final mixture.

[6] A second aspect of the invention relates to a composition comprising 50 to 80% (preferably more than 60%) by weight of the master mixture according to the invention and 20 to 50% (preferably less than 40%) by weight of a polymer.

[7] The invention also relates to a horological or jewelry component such as a watch bracelet, or a watch case comprising a composition according to the invention.

[8] Finally, the invention relates to a method for manufacturing a photoluminescent horological component comprising the steps of:

a. producing a master mixture according to one of [1] to [5];

b. mixing the master mixture in a polymer compatible with said master mixture to obtain a composition;

c. shaping the composition obtained in b) to obtain a photoluminescent horological component.

DETAILED DESCRIPTION

A first aspect of the invention relates to a concentrated polymeric mixture (master mixture) comprising a phosphorescent pigment (ARALON®, Radiant Color, etc.), said composition being suitable for use in a rubber preferably of the fluoroelastomer type.

The use of such a master mixture makes it possible to overcome the disadvantages cited above.

According to the first aspect of the invention, the phosphorescent pigment, in powder form, is sifted so as to only retain a fraction of a size less than 30 μm (size determined by the sifting per se). It was indeed discovered that below this size, the abrasion of the tools for working the polymers was reduced. The phosphorescent particles of larger size can either be used for other applications, or be ground to achieve a size less than 30 μm.

Then, the pigment is encapsulated in a polymer, in the form of a concentrated composition or master mixture. This encapsulation makes it possible to reduce direct contact with the final mixing tool of the polymeric mixture with a view to forming the sought object.

The embodiment of a master mixture is a first process for encapsulating the pigment in a matrix in which the properties do not interact with the absorption and emission ranges of the photoluminescent pigment.

This master mixture comprises an elastomer or an elastomer precursor optically transparent in the 360 nm to 650 nm range and chemically compatible with the sought elastomer in the mixture (elastomer content: from 2% to 10% by weight, preferably from 4 to 8%).

Elastomer precursor means in the present description a polymer of low molecular weight frequently liquid at ambient temperature, or capable of easily being rendered liquid by dissolving in a solvent or intended to be subsequently crosslinked with the elastomer of the final mixture.

The elastomer or the precursor thereof is preferably chosen from fluorinated elastomers such as those of the FKM (crosslinkable fluoro or perfluoropolyalkylene) family or thermoplastic elastomers such as TPUs (Polyurethanes), EVAs (Ethylene vinyl acetate copolymer), silicones, EPRs (ethylene propylene rubber) and the thermoplastic derivatives (TPO) thereof or the acrylic elastomer family.

In the case of the use of an elastomer precursor, the crosslinking system (typically, an initiator, for example an organic peroxide, accompanied by a crosslinking co-agent) can either be integrated in the master mixture, or subsequently in the final mixture.

The latter solution, having the advantage of a stable master mixture over time, is preferred. In particular, the master mixture can then be made in the presence of a solvent enabling a high viscosity reduction. This viscosity reduction then enables the use of a rapid mixer such as a Turrax®. The absence of the crosslinking system in the master mixer then makes it possible to remove the solvent by hot evaporation, without crosslinking starting at an unsuitable time.

In the case of a thermoplastic, the master mixture is prepared in a conventional twin-screw, corotating or contra-rotating conventional mixing installation. In this case, the quality of the dispersion in the master mixture can be improved by using polymer of reduced viscosity with respect to the final mixture. This viscosity reduction can also be obtained or improved using waxes.

A person skilled in the art will easily understand that, as a general rule, the matrix used in the master mixture is preferably compatible with the matrix wherein the master mixture must be dispersed. Ideally, the matrix of the master mixture is of the same type as the matrix of the final composition.

Advantageously, the master mixture also contains oils or waxes with a mass content from 0.2 to 2%, preferably from 0.4 to 1.8% by weight with respect to the polymer. These waxes and oils, by reducing the viscosity, enable a greater incorporation of photoluminescent pigments. These waxes and oils are selected from waxes and oils optically transparent in the 360 nm to 650 nm range.

The master mixture can thus contain up to 95% (by mass) of photoluminescent pigments, which ensures high luminescent performances.

The master mixture can advantageously contain fluorochromes or chromophores (optical brighteners, pigments or dyestuffs, etc.) for doping the luminescent properties or triggering a photochemical cascade in order to obtain different coloured luminescent emissions from that of the initially chosen photoluminescent pigment.

The master mixture thus formed is then dispersed in the final composition according to milder mixing conditions (warming and limited shear rate): in the case of crosslinked systems, the final mixture is then typically made in an open mixer such as a calender, or, in the case of thermoplastics in a single-screw extruder comprising mixing sections and/or one or more static mixers.

In order to incorporate a large quantity of pigment in the final mixture, the master mixture, after evaporating any solvent, is mixed by 50 to 80% by weight in the final mixture.

The mixture obtained is then moulded or extruded in the definitive shape thereof, for example a wristwatch.

Example of Photoluminescent Mixture Preparation

The following master mixture is produced:

- Solvay pure Tecnoflon® P-457 grade FKM which is manufactured on a clean line and which is transparent is used as the master mixture matrix.
- Tecnoflon® P-457 is diluted in a 1:1 ratio in Methyl Ether Ketone (MEK) or in Ethyl Acetate.

The photoluminescent pigment previously sifted at 30 μm is incorporated in the mixture obtained in the preceding step, the quantity of pigment being in a 1:1 ratio with respect to Tecnoflon® P-457 and the whole is mixed on a high-speed mixer at 3000 rpm-1.

A fluorochrome is introduced at a rate of 0.5% with respect to the total (i.e. 1.5% with respect to the FKM polymer) and the whole is once again mixed on a high-speed mixer, for example at 3000 rpm-1.

The solvent is evaporated in an oven at around 80° C. until the solvent is removed.

The previously made master mixture is incorporated at a rate of 60% minimum in a pure P-457 FKM by working on an open mixer.

At the end of mixing, a vulcanisation system is added (2.5% by weight of Luperox® 101XL-45+3% by weight of Drimix® TAlC 75%, the percentages being expressed with respect to the polymer).

Preferably, Nafol 1822B™ oil marketed by Sasol (up to 1.8%) is also added. The whole forms the optimised photoluminescent FKM mixture, ready to be shaped and crosslinked.

The mixture obtained is then moulded by compression and crosslinked in the final shape thereof. The component thus obtained has a pigment concentration of 30%, and the pigments are distributed homogeneously, without particle agglomeration, which makes it possible to have optimal optical photoluminescence properties.

The invention claimed is:

1. A polymeric composition comprising 20 to 50% by weight of a polymer and 50 to 80% by weight of a master mixture comprising:
   - from 40 to 95% by weight of a photoluminescent pigment, said pigment having a particle size limited by sifting at 30 μm;
   - 5 to 60% by weight of a polymer matrix in the form of an elastomer or an elastomer precursor chosen from fluorinated polymers from the FKM family, silicones, ethylene propylene rubbers (EPR) and acrylic elastomers,
   - wherein the master mixture comprises 0.2 to 2% wax and/or oil, and 0.1 to 2% chromophores and/or fluorochromes.

2. The polymeric composition according to claim 1 wherein the polymer matrix is an FKM.

3. The polymeric composition according to claim 1 comprising no crosslinking agent.

4. The polymeric composition according to claim 1 comprising at least 60% master mixture and 40% by weight of the polymer.

5. The polymeric composition according to claim 1 comprising a crosslinking system comprising an organic peroxide and a crosslinking co-agent when the polymer matrix is in the form of an elastomer precursor.

6. A horological or jewelry component comprising a composition according to claim 1.

7. A method for manufacturing a photoluminescent horological component comprising the steps of:
   - a. producing a master mixture comprising: from 40 to 95% by weight of a photoluminescent pigment, said pigment having a particle size limited by sifting at 30 μm; and 5 to 60% by weight of a polymer matrix in the form of an elastomer or an elastomer precursor chosen from fluorinated polymers from the FKM family, silicones, ethylene propylene rubbers (EPR) and acrylic elastomers;
   - b. mixing the master mixture in a polymer compatible with said master mixture to obtain a composition; and c. shaping the composition obtained in b) to obtain a photoluminescent horological component.

* * * * *